US012634935B2

(12) United States Patent
Zhang et al.

(10) Patent No.: US 12,634,935 B2
(45) Date of Patent: May 19, 2026

(54) COMMUNICATION METHODS, DEVICES AND COMPUTER READABLE MEDIA FOR TRANSMITTING A PHYSICAL SIDELINK SHARED CHANNEL

(71) Applicant: NEC CORPORATION, Tokyo (JP)

(72) Inventors: Shichang Zhang, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 841 days.

(21) Appl. No.: 17/636,681

(22) PCT Filed: Sep. 30, 2019

(86) PCT No.: PCT/CN2019/109630
§ 371 (c)(1),
(2) Date: Feb. 18, 2022

(87) PCT Pub. No.: WO2021/062723
PCT Pub. Date: Apr. 8, 2021

(65) Prior Publication Data
US 2022/0279497 A1     Sep. 1, 2022

(51) Int. Cl.
*H04W 72/20* (2023.01)
*H04L 5/00* (2006.01)
(52) U.S. Cl.
CPC ........... *H04W 72/20* (2023.01); *H04L 5/0048* (2013.01); *H04L 5/0092* (2013.01)
(58) Field of Classification Search
CPC ..... H04W 72/20; H04W 72/25; H04W 72/27; H04W 72/29; H04L 5/0048; H04L 5/0092; H04L 5/0051; H04L 5/0044
See application file for complete search history.

(56) References Cited

U.S. PATENT DOCUMENTS

| | | | | |
|---|---|---|---|---|
| 2019/0200326 A1* | 6/2019 | Shin | ...................... | H04L 5/0051 |
| 2021/0067290 A1* | 3/2021 | Chen | .................... | H04L 5/0033 |

(Continued)

FOREIGN PATENT DOCUMENTS

| | | |
|---|---|---|
| CN | 109076478 A | 12/2018 |
| JP | 2020-527874 A | 9/2020 |

(Continued)

OTHER PUBLICATIONS

"Physical layer structure for sidelink" 3GPP TSG RAN WG1 Meeting #97 Reno, USA, May 13-17, 2019 (R1-1907047) (Year: 2019).*

(Continued)

*Primary Examiner* — Sun Jong Kim
(74) *Attorney, Agent, or Firm* — Sughrue Mion, PLLC

(57) ABSTRACT

Communication methods, devices and a computer readable medium in the wireless communication system. A communication method is performed at a receiving terminal device in the sidelink communication. In the communication method, sidelink control information (SCI) is received from a transmitting terminal device, the SCI indicating an additional DMRS symbol number for the sidelink data channel. Then, duration of the sidelink data channel is determined according to the number of symbols within a slot and the number of symbols for a sidelink feedback channel. Next, a DMRS pattern to be used for the sidelink data channel is determined based on the received additional DMRS symbol number for the sidelink data channel and the determined duration of the sidelink data channel.

13 Claims, 7 Drawing Sheets

(56) References Cited

U.S. PATENT DOCUMENTS

| | | | | | |
|---|---|---|---|---|---|
| 2021/0127376 | A1* | 4/2021 | Zeng | ..................... | H04W 72/20 |
| 2021/0203462 | A1* | 7/2021 | Xiang | ................... | H04L 5/0044 |
| 2021/0314933 | A1* | 10/2021 | Zhang | ................... | H04W 72/20 |
| 2021/0400681 | A1* | 12/2021 | Wang | ................ | H04W 72/0453 |
| 2022/0264603 | A1* | 8/2022 | Yang | ..................... | H04L 1/1896 |
| 2022/0294570 | A1* | 9/2022 | Hahn | ................... | H04L 5/0055 |
| 2022/0304032 | A1* | 9/2022 | Hahn | ................... | H04W 76/14 |

FOREIGN PATENT DOCUMENTS

| | | |
|---|---|---|
| WO | 2017/026975 A1 | 2/2017 |
| WO | 2019/137057 A1 | 7/2019 |

OTHER PUBLICATIONS

Discussion on Physical layer structure for NR sidelink, 3GPP TSG RAN WG1 #98 (R1-1908900) (Year: 2019).*

TCL Communications, "Physical Layer Structure for Sidelink", 3GPP TSG RAN WG1 Meeting #97, R1-1907047, May 13-17, 2019, pp. 1-10, Reno, USA.

ZTE, Sanechips, "NR sidelink physical layer structure", 3GPP TSG RAN WG1 #97, R1-1906457, May 13-17, 2019, pp. 1-12, Reno, USA.

International Search Report of PCT/CN2019/109630 dated Jul. 3, 2020 [PCT/ISA/210].

Written Opinion of PCT/CN2019/109630 dated Jul. 3, 2020 [PCT/ISA/237].

Notification of Reasons for Refusal dated Apr. 25, 2023 from the Japanese Patent Office in application No. 2022-519523.

Samsung, "Feature lead summary#2 for 7.2.4.1 Physical layer structure for sidelink", 3GPP TSG RAN WG1 #97 R1-190775, Reno, USA, May 13-17, 2019, pp. 1-26 (27 total pages).

Qualcomm Incorporated, "Considerations on Physical Layer aspects of NR V2X, 3GPP TSG RAN WG1 #97 R1-1907269", Reno, USA, May 13-17, 2019, pp. 2-17 (16 total pages).

Huawei, HiSilicon, "Reference signal design for sidelink control and data channel", 3GPP TSG RAN WG1 #96 R1-1901538, Athens, Greece, Feb. 25-Mar. 1, 2019, pp. 2-10 (9 total pages).

CN Office Action for CN Application No. 201980098892.4, mailed on Jan. 13, 2025 with English Translation.

Intel Corporation, "Physical Structure for NR V2X", 3GPP TSG RAN WG1 Meeting #98 R1-1908633, Aug. 17, 2019, p. 1-p. 24.

CN Office Action for CN Application No. 201980098892.4, mailed on Jul. 15, 2025 with English Translation.

Huawei, HiSilicon, "Sidelink physical layer structure for Nr V2X", 3GPP TSG RAN WG1 Meeting #96bis R1-1903943, Apr. 3, 2019.

LG Electronics, "Discussion on physical layer structure for NR sidelink", 3GPP TSG RAN WG1 #98 R1-1908900, Aug. 17, 2019.

* cited by examiner

| SCS | Useful Symbol | CP | Symbol | TX< - >RX | AGC |
|------|------|------|------|------|------|
| 15 | 66.667 | 4.688 | 71.354 | 13us | 35us |
| 30 | 33.333 | 2.344 | 35.677 | | 35us |
| 60 | 16.667 | 1.172 | 17.839 | | 18us |
| 60 | 16.667 | 4.167 | 20.833 | | 18us |
| 120 | 8.3333 | 0.586 | 8.9193 | 7us | |

TABLE 1

| PSSCH duration in symbols | DM- RS positions | | | |
|---|---|---|---|---|
| | Additional DMRSnumber | | | |
| | 0 | 1 | 2 | 3 |
| <4 | - | - | - | - |
| 4 | 1 | 1 | 1 | 1 |
| 5 | 1 | 1 | 1 | 1 |
| 6 | 1 | 1 | 1 | 1 |
| 7 | 1 | 1 | 1 | 1 |
| 8 | 1 | 1,6 | 1,6 | 1,6 |
| 9 | 1 | 1,6 | 1,6 | 1,6 |
| 10 | 1 | 1,8 | 1,5,8 | 1,5,8 |
| 11 | 1 | 1,8 | 1,5,8 | 1,5,8 |
| 12 | 1 | 1,8 | 1,5,8 | 1, 4, 7,10 |

Fig. 4

TABLE 2

| PSSCH duration in symbols | DM - RS positions | | | |
|---|---|---|---|---|
| | Additional DMRS number | | | |
| | 0 | 1 | 2 | 3 |
| <4 | - | - | - | - |
| 4 | 1 | 1 | 1 | 1 |
| 5 | 1 | 1,5 | 1,5 | 1,5 |
| 6 | 1 | 1,5 | 1,5 | 1,5 |
| 7 | 1 | 1,5 | 1,5 | 1,5 |
| 8 | 1 | 1, 6 | 1, 6 | 1, 6 |
| 9 | 1 | 1,6 | 1, 6 | 1, 6 |
| 10 | 1 | 1, 8 | 1, 5,8 | 1, 5,8 |
| 11 | 1 | 1, 8 | 1, 5,8 | 1, 5,8 |
| 12 | 1 | 1, 8 | 1, 5,8 | 1, 4, 7, 10 |

Fig. 5

TABLE 3

| PSSCH duration in symbols | DM-RS positions | | | |
| --- | --- | --- | --- | --- |
| | Additional DMRS number | | | |
| | 0 | 1 | 2 | 3 |
| <4 | - | - | - | - |
| 4 | 2 | 2 | 2 | 2 |
| 5 | 2 | 2 | 2 | 2 |
| 6 | 2 | 2 | 2 | 2 |
| 7 | 2 | 2 | 2 | 2 |
| 8 | 2 | 2,7 | 2,7 | 2,7 |
| 9 | 2 | 2,7 | 2,7 | 2,7 |
| 10 | 2 | 2, 9 | 2, 6, 9 | 2, 6, 9 |
| 11 | 2 | 2, 9 | 2, 6, 9 | 2, 6, 9 |
| 12 | 2 | 2, 9 | 2, 6, 9 | 2,5,8, 11 |

Fig. 6

TABLE 4

| PSSCH duration in symbols | DM-RS positions | | | |
| --- | --- | --- | --- | --- |
| | Additional DMRS number | | | |
| | 0 | 1 | 2 | 3 |
| <4 | 0 | 0 | 0 | 0 |
| 4 | 0 | 0 | 0 | 0 |
| 5 | 0 | 0,4 | 0,4 | 0,4 |
| 6 | 0 | 0,4 | 0,4 | 0,4 |
| 7 | 0 | 0,4 | 0,4 | 0,4 |
| 8 | 0 | 0,6 | 0,3, 6 | 0,3, 6 |
| 9 | 0 | 0,6 | 0,3, 6 | 0,3, 6 |
| 10 | 0 | 0,8 | 0,4, 8 | 0,3, 6, 9 |
| 11 | 0 | 0,8 | 0,4, 8 | 0,3, 6, 9 |

Fig. 7

TABLE 3

| PSSCH duration in symbols | DMRS positions | | | |
|---|---|---|---|---|
| | Additional DMRS number | | | |
| | 0 | 1 | 2 | 3 |
| <4 | - | - | - | - |
| 4 | 2 | 2 | 2 | 2 |
| 5 | 2 | 2 | 2 | 2 |
| 6 | 2 | 2 | 2 | 2 |
| 7 | 2 | 2 | 2 | 2 |
| 8 | 2 | 2,7 | 2,7 | 2,7 |
| 9 | 2 | 2,7 | 2,7 | 2,7 |
| 10 | 2 | 2, 9 | 2, 6, 9 | 2, 6, 9 |
| 11 | 2 | 2, 9 | 2, 6, 9 | 2, 6, 9 |
| 12 | 2 | 2, 9 | 2, 6, 9 | 2,5,8 ,11 |

For duration determination not considering PSCCH

TABLE 4

| PSSCH duration in symbols | DM RS positions | | | |
|---|---|---|---|---|
| | Additional DMRS number | | | |
| | 0 | 1 | 2 | 3 |
| <4 | 0 | 0 | 0 | 0 |
| 4 | 0 | 0 | 0 | 0 |
| 5 | 0 | 0,4 | 0,4 | 0,4 |
| 6 | 0 | 0,4 | 0,4 | 0,4 |
| 7 | 0 | 0,4 | 0,4 | 0,4 |
| 8 | 0 | 0,6 | 0,3, 6 | 0,3, 6 |
| 9 | 0 | 0,6 | 0,3, 6 | 0,3, 6 |
| 10 | 0 | 0,8 | 0,4, 8 | 0,3, 6, 9 |
| 11 | 0 | 0,8 | 0,4, 8 | 0,3, 6, 9 |

For duration determination considering PSCCH

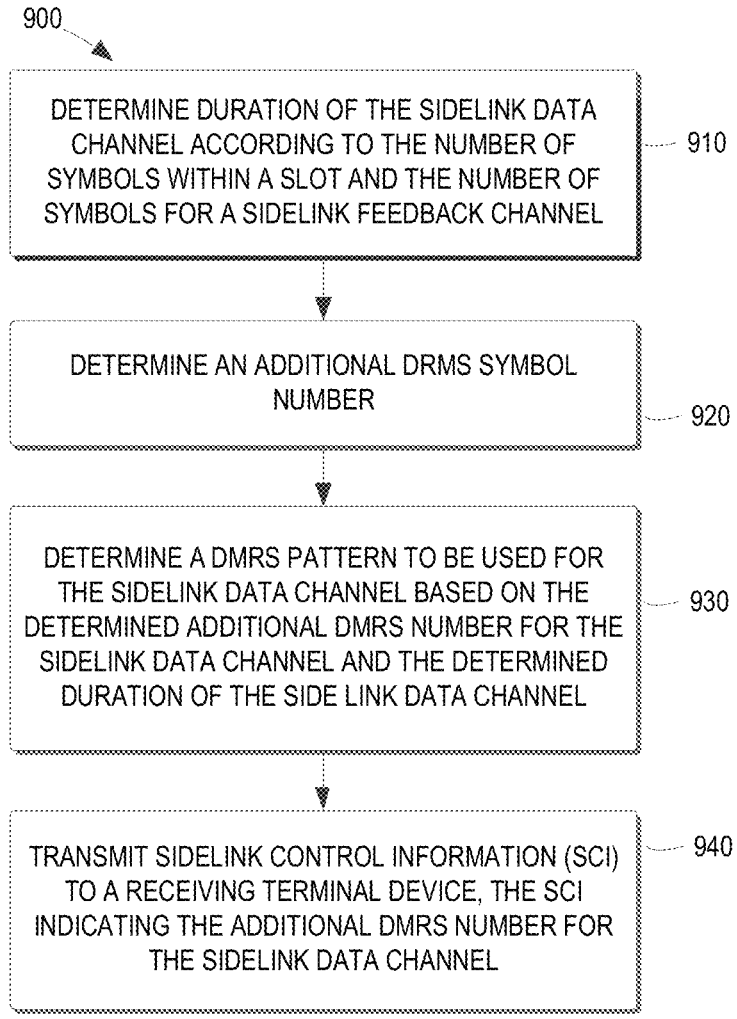

DETERMINE DURATION OF THE SIDELINK DATA CHANNEL ACCORDING TO THE NUMBER OF SYMBOLS WITHIN A SLOT AND THE NUMBER OF SYMBOLS FOR A SIDELINK FEEDBACK CHANNEL — 910

DETERMINE AN ADDITIONAL DRMS SYMBOL NUMBER — 920

DETERMINE A DMRS PATTERN TO BE USED FOR THE SIDELINK DATA CHANNEL BASED ON THE DETERMINED ADDITIONAL DMRS NUMBER FOR THE SIDELINK DATA CHANNEL AND THE DETERMINED DURATION OF THE SIDE LINK DATA CHANNEL — 930

TRANSMIT SIDELINK CONTROL INFORMATION (SCI) TO A RECEIVING TERMINAL DEVICE, THE SCI INDICATING THE ADDITIONAL DMRS NUMBER FOR THE SIDELINK DATA CHANNEL — 940

Fig.9

COMMUNICATION METHODS, DEVICES AND COMPUTER READABLE MEDIA FOR TRANSMITTING A PHYSICAL SIDELINK SHARED CHANNEL

CROSS REFERENCE TO RELATED APPLICATIONS

This application is a National Stage of International Application No. PCT/CN2019/109630, filed Sep. 30, 2019.

FIELD OF THE INVENTION

The non-limiting and exemplary embodiments of the present disclosure generally relate to the field of wireless communication techniques, and more particularly relate to communication methods, devices and computer readable media in a wireless communication system.

BACKGROUND OF THE INVENTION

This section introduces aspects that may facilitate better understanding of the disclosure. Accordingly, the statements of this section are to be read in this light and are not to be understood as admissions about what is in the prior art or what is not in the prior art.

New radio access system, also called as NR system or NR network, is the next generation communication system. The third generation Partnership Project (3GPP) working group was already approved the study of the NR system. The NR system will consider frequency ranging up to 100 Ghz with an object of a single technical framework addressing all usage scenarios, requirements and deployment scenarios, which includes requirements such as enhanced mobile broadband, massive machine-type communications, and ultra-reliable and low latency communications.

In order to improve the data rate performance, in the 3GPP Long Term Evolution (LTE), there was introduced a sidelink technology, which allows direct communication between two nearby LTE devices without going through a base station. Communications like Device-to-Device (D2D) communication, Vehicle to Vehicle (V2V) communication, Vehicle to Everythings (V2X) communication, etc., all perform data transmission based on the sidelink technology.

In the NR system, sidelink solutions on the NR unlicensed band (NR-U) are studied. The NR system would support (pre-)configuration of one or more DMRS patterns for physical sidelink shared channel (PSSCH) and the exact DMRS pattern is indicated by Transmitter (TX) terminal device using Sidelink Control Information (SCI). For Mode 2, the DMRS pattern can be chosen by transmitting terminal device from the (pre-)configured patterns for the resource pool. However, issues like the number of DMRS patterns, possible DMRS patterns, the way of determining the DMRS pattern to be used and the way of indicating the DMRS pattern are still not to be addressed yet.

SUMMARY OF THE INVENTION

In general, example embodiments of the present disclosure provide a new communication solution in a wireless communication system.

According to a first aspect of the present disclosure, there is provided a communication method. The communication method can be performed at a receiving terminal device and one of its objects is to provide an improved DMRS transmission of sidelink data channel. The communication method may include receiving sidelink control information (SCI) from a transmitting terminal device, the SCI indicating an additional DMRS symbol number for the sidelink data channel; determining duration of the sidelink data channel according to a number of symbols within a slot and a number of symbols for a sidelink feedback channel; and determining a DMRS pattern to be used for the sidelink data channel based on the received additional DMRS symbol number for the sidelink data channel and the determined duration of the sidelink data channel.

According to a second aspect of the present disclosure, there is provided a communication method. The communication method can be performed at a transmitting terminal device and one of its objects is to provide an improved DMRS transmission of sidelink data channel. The communication method may include determining duration of the sidelink data channel according to a number of symbols within a slot and a number of symbols for a sidelink feedback channel; determining an additional DRMS symbol number; determining a DMRS pattern to be used for the sidelink data channel based on the determined additional DMRS symbol number for the sidelink data channel and the determined duration of the sidelink data channel; and transmitting sidelink control information (SCI) to a receiving terminal device, the SCI indicating the additional DMRS symbol number for the sidelink data channel.

According to a third aspect of the present disclosure, there is provided a terminal device. The terminal device may be for example a receiving network device in the sidelink communication. The terminal device may include at least one processor and at least one memory coupled with the at least one processor. The at least one memory has computer program codes stored therein which are configured to, when executed on the at least one processor, cause the terminal device to perform operations of any of the first aspect.

According to a fourth aspect of the present disclosure, there is provided another terminal device. The other terminal device may be for example a transmitting network device in the sidelink communication. The terminal device may include at least one processor and at least one memory coupled with the at least one processor. The at least one memory has computer program codes stored therein which are configured to, when executed on the at least one processor, cause the terminal device to perform operations of any of the second aspect.

According to a fifth aspect of the present disclosure, there is provided a computer-readable storage medium having a computer program stored thereon which, when executed by at least one processor of a device, causes the device to perform actions in the method according to any embodiment in the first aspect.

According to a sixth aspect of the present disclosure, there is provided a computer-readable storage medium having a computer program stored thereon which, when executed by at least one processor of a device, causes the device to perform actions in the method according to any embodiment in the second aspect.

According to a seventh aspect of the present disclosure, there is provided a computer program product comprising a computer-readable storage medium according to the fifth aspect.

According to an eighth aspect of the present disclosure, there is provided a computer program product comprising a computer-readable storage medium according to the sixth aspect.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which:

FIG. 4 illustrates an example DMRS pattern mapping table according to embodiments of the present disclosure;

FIG. 5 illustrates another example DMRS pattern mapping table according to embodiments of the present disclosure;

FIG. 6 illustrate a further example DMRS pattern mapping table according to embodiments of the present disclosure;

FIG. 7 illustrate a yet further example DMRS pattern mapping table according to embodiments of the present disclosure;

FIG. 8 illustrate a still further example DMRS pattern mapping table according to embodiments of the present disclosure;

FIG. 9 illustrates a communication method at a transmitting terminal device according to embodiments of the present disclosure.

DETAILED DESCRIPTION OF EMBODIMENTS

Figure 1:
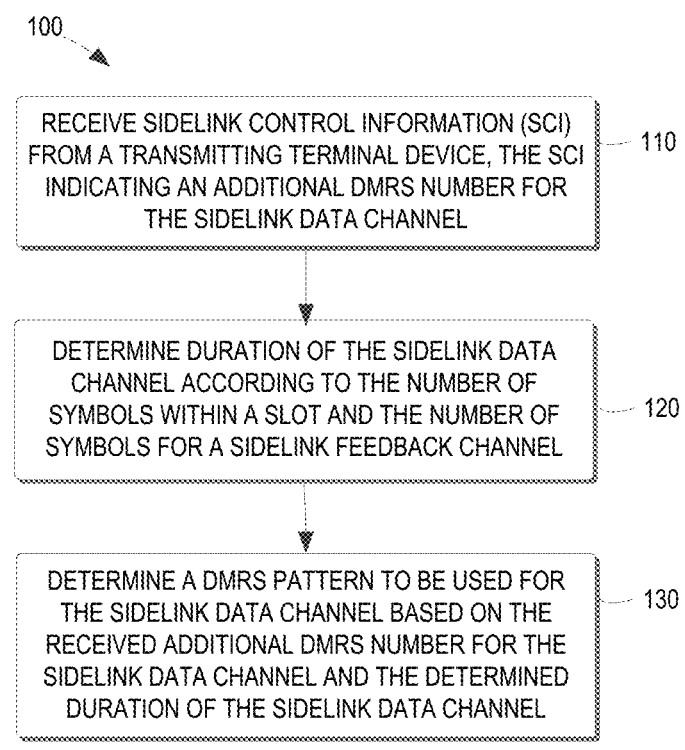
FIG. 1 illustrates a communication method at a receiving terminal device according to embodiments of the present application.

Hereinafter, the solutions as provided in the present disclosure will be described in details through embodiments with reference to the accompanying drawings. It should be appreciated that these embodiments are presented only to enable those skilled in the art to better understand and implement the present disclosure, not intended to limit the scope of the present disclosure in any manner. For example, features illustrated or described as part of one embodiment may be used with another embodiment to yield still a further embodiment. In the interest of clarity, not all features of an actual implementation are described in this specification.

In the accompanying drawings, various embodiments of the present disclosure are illustrated in block diagrams, flow charts and other diagrams. Each block in the flowcharts or blocks may represent a module, a program, or a part of code, which contains one or more executable instructions for performing specified logic functions, and in the present disclosure, a dispensable block is illustrated in a dotted line. Besides, although these blocks are illustrated in particular sequences for performing the steps of the methods, as a matter of fact, they may not necessarily be performed strictly according to the illustrated sequence. For example, they might be performed in reverse sequence or simultaneously, which is dependent on natures of respective operations. It should also be noted that block diagrams and/or each block in the flowcharts and a combination of thereof may be implemented by a dedicated hardware-based system for performing specified functions/operations or by a combination of dedicated hardware and computer instructions.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used herein, the term "wireless communication network" refers to a network following any suitable wireless communication standards, such as New Radio (NR), Long Term Evolution (LTE), LTE-Advanced (LTE-A), Wideband Code Division Multiple Access (WCDMA), High-Speed Packet Access (HSPA), and so on. The "wireless communication network" may also be referred to as a "wireless communication system." Furthermore, communications between network devices, between a network device and a terminal device, or between terminal devices in the wireless communication network may be performed according to any suitable communication protocol, including, but not limited to, Global System for Mobile Communications (GSM), Universal Mobile Telecommunications System (UMTS), Long Term Evolution (LTE), New Radio (NR), wireless local area network (WLAN) standards, such as the IEEE 802.11 standards, and/or any other appropriate wireless communication standard either currently known or to be developed in the future.

As used herein, the term "network device" refers to a node in a wireless communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

As used herein, the term "terminal device" refers to any device having wireless or wired communication capabilities.

Examples of the terminal device include, but not limited to, user equipment (UE), personal computers, desktops, mobile phones, cellular phones, smart phones, personal digital assistants (PDAs), portable computers, tablets, wearable devices, interne of things (IoT) devices, Internet of Everything (IoE) devices, machine type communication (MTC) devices, device on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like.

In one embodiment, the terminal device may be connected with a first network device and a second network device. One of the first network device and the second network device may be a master node and the other one may be a secondary node. The first network device and the second network device may use different radio access technologies (RATs). In one embodiment, the first network device may be a first RAT device and the second network device may be a second RAT device. In one embodiment, the first RAT device is eNB and the second RAT device is gNB. Information related with different RATs may be transmitted to the terminal device from at least one of the first network device and the second network device. In one embodiment, a first information may be transmitted to the terminal device from the first network device and a second information may be transmitted to the terminal device from the second network device directly or via the first network device. In one embodiment, information related with configuration for the terminal device configured by the second network device may be transmitted from the second network device via the first network device. Information related with reconfiguration for the terminal device configured by the second network device may be transmitted to the terminal device from the second network device directly or via the first network device.

As a yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink (DL) transmission refers to a transmission from a network device to UE, or from a network device as a parent node to another network device as a child node, and an uplink (UL) transmission refers to a transmission in an opposite direction.

In the NR system, issues like the number of DMRS patterns, possible DMRS patterns, the way of determining the DMRS pattern to be used and the way of indicating the DMRS pattern are still not to be addressed yet. Thus, it requires a communication system with some enhancements on DMRS pattern transmission in the NR system.

Embodiments of the present disclosure provide a new communication solution and one of its objects is to provide improved DMRS pattern transmission. In some embodiments of the present disclosure, the transmitting terminal device transmits SCI to the receiving terminal device to indicate an additional DMRS symbol number for the sidelink data channel. The receiving terminal device could determine the duration of the sidelink data channel according to a number of symbols within a slot and a number of symbols for a sidelink feedback channel and determines the DMRS pattern to be used based on the received SCI and the determined duration of the sidelink data channel. In this way, it is possible to determine the DMRS pattern to be used in the sidelink data channel.

Hereinafter, reference will be further made to accompanying drawings to describe the solutions as proposed in the present disclosure in details. However, it shall be appreciated that the following embodiments are given only for illustrative purposes and the present disclosure is not limited thereto. In addition, the solution as provided herein can be used in the NR system or any other communication with similar issues.

Reference will be first made to FIG. 1 to describe an example communication method according to embodiments of the present application. The communication method could be performed at a receiving terminal device in the sidelink communication.

As illustrated in FIG. 1, in block 110, the receiving terminal device may receive sidelink control information (SCI) from a transmitting terminal device, the SCI indicating an additional DMRS symbol number for the sidelink data channel. The additional DMRS symbol number for the sidelink data channel is determined by the transmitting terminal device and is informed by SCI with for example two bits.

In block 120, the receiving terminal device may determine duration of the sidelink data channel according to the number of symbols within a slot and the number of symbols for a sidelink feedback channel. In response to receipt of the SCI, the receiving terminal device could further determine the duration of the sidelink data channel.

In some embodiments of present disclosure, the terminal device may determine a maximum number of symbols for the sidelink data channel within a slot as the duration of the sidelink data channel without considering sidelink control channel.

In other words, for both sub-channel(s) containing a sidelink control channel and sub-channel(s) not containing a sidelink control channel separately, the duration of the sidelink data channel can be determined as the number of symbols available for the sidelink data channel within a slot in a case of no PSCCH.

Figure 2A:
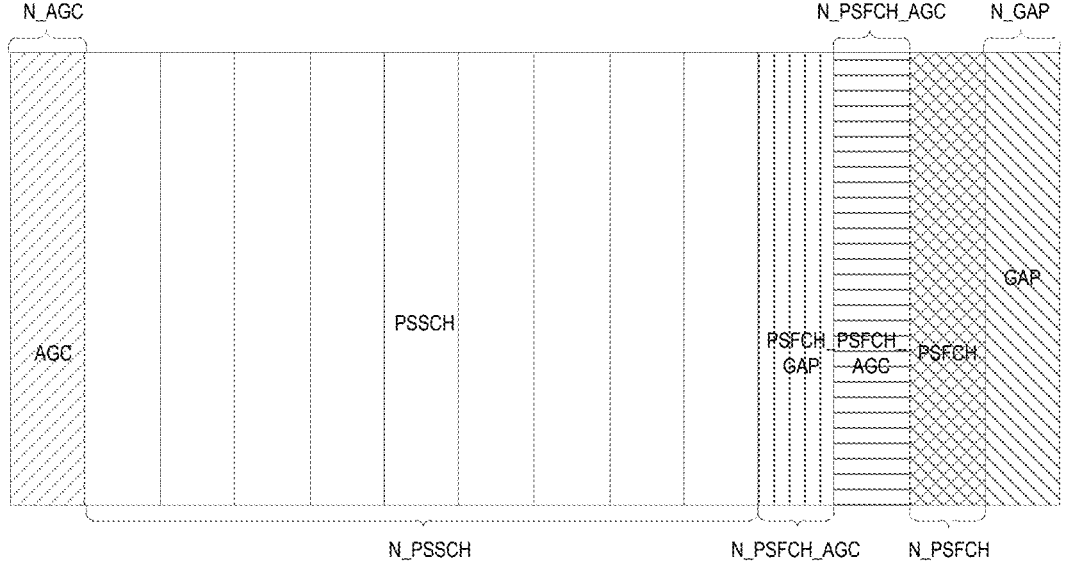
FIGS. 2A and 2B illustrate example methods for determining duration of the Physical Sidelink Shared Channel (PSSCH) according to embodiments of the present disclosure.

Next, reference is to made to FIG. 2A to describe illustrates an example method for determining duration of the Physical Sideline Shared Channel (PSSCH) according to embodiments of the present disclosure.

As illustrated in FIG. 2A, in a slot with 14 symbols, there are symbols for automatic gain control (AGC), protection gap, for Physical Sidelink Feedback Channel (PSFCH), for AGC of the PSFCH, for gap of the PSFCH. According to embodiments of the present disclosure, the duration of PSSCH D_PSSCH can be determined as $$D\_PSSCH = N\_Symb - N\_AGC - N\_Gap - N\_PSFCH - N\_PSFCH\_AGC - N\_PSFCH\_Gap \quad \text{(Equation 1)}$$

wherein

N_Symb denotes the total number of OFDM symbols for the PSSCH in the slot;

N_AGC denotes the number of symbols for AGC in the slot;

N_Gap denotes the number of symbols for protection gap in the slot;

N_PSFCH denotes the number of symbols for PSFCH in the slot;

N_PSFCH_AGC denotes the number of symbols for AGC of PSFCH in a slot; and

N_PSFCH_Gap denotes the number of symbols for gap pf PSFCH in a slot.

AS the total number of OFDM symbols in the slot for the PSSCH, N_Symb may equal to 14 for normal cyclic shift and it may equal to 12 for extended cyclic shift on Intelligence Transportation System (ITS) dedicated carrier and (pre-)configured in case of the sidelink sharing carrier with Uu interface communication (i.e., those communication going through a network device). The number N_AGC denotes the number of symbols designed for AGC, wherein AGC is usually located at the beginning of a slot and uses one symbol. The number N_Gap denotes the number of symbols for protection gap which is designed for RX/TX switching and is usually located at the end of slot. The value of N_PSFCH is explicitly configured per carrier or per BWP and the number N_PSFCH can be set as zero if all symbols available for sidelink in a slot can be used for PSFCH. The AGC for PSFCH is usually located immediately before the N_PSFCH symbols. The value of N_PSFCH_AGC can be set as zero if there is no PSFCH resources configured in the slot or all symbols available for sidelink in a slot can be used for PSFCH. The gap for PSFCH is for RX/TX switching and thus usually located immediately before the PSFCH_AGC symbols. The value of N_PSFCH_Gap can be set as zero if any of the following conditions is met:

all symbols available for sidelink in a slot can be used for PSFCH; or there is no PSFCH resources configured before N_Gap symbol; or There are PSFCH resources configured before N_Gap symbol, but the subcarrier spacing (SCS) of the carrier is 15 kHz (in a case of 15 KHz, the PSFCH_Gap can share a symbol with the AGC for PSFCH); or, there are PSFCH resources configured before N_Gap symbol, but the terminal device is not allowed to change TX/RX direction in the middle of slot (no gap symbol is needed in this situation); or, there are PSFCH resources configured before N_Gap symbol, but the PSFCH can be transmitted in the first half of N-Gap symbol. In such a case, the PSFCH_Gap is transmitted in first half of a symbol, a first part the PSFCH_AGC is transmitted in a second half of the symbol, and the remaining PSFCH AGC share a symbol with PSFCH. The last part of PSFCH can be transmitted in the first half of N_Gap symbol and the N_Gap only uses the second half of the N_Gap symbol.

Figures 2B, 3:
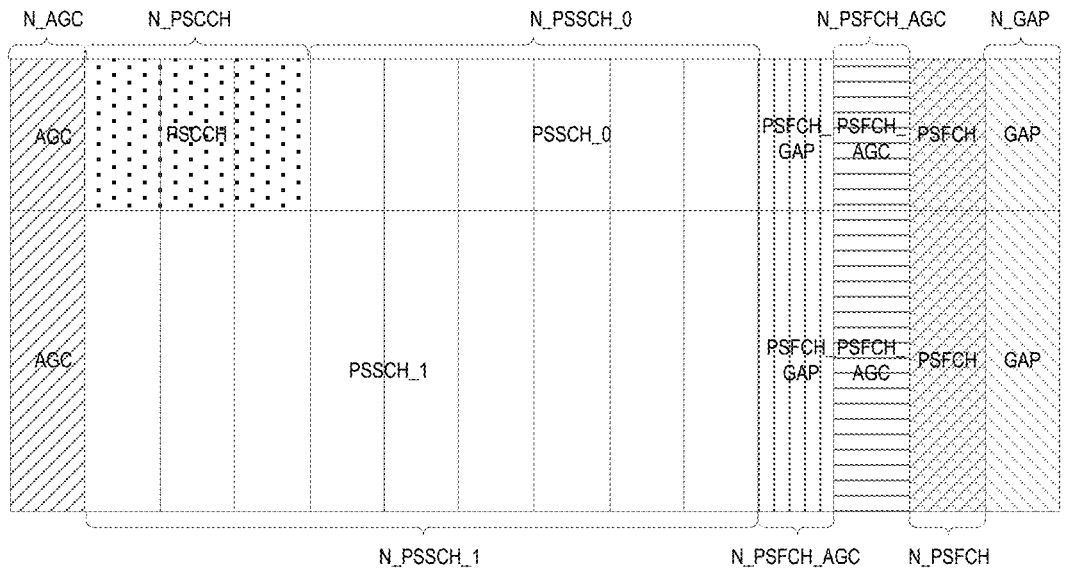
FIG. 3 illustrates parameter configuration for different subcarrier spacing.

As mentioned in above, for different SCS of the carrier, the duration of PSSCH might be different and thus the determining duration of the sidelink data channel is further based on a subcarrier spacing. As illustrated in FIG. 3, for different SCS, the symbol has different size and the Gap and AGC have different durations too. For example, for 15 KHz, the gap requires 13 μs, the AGC requires 35 μs and a useful symbol has a size of 66.667, in such a case the gap and the AGC for the PSFCH can share one symbol, while for other SCS, the gap and AGC need use more symbols.

In some embodiments of the present disclosure, as an alternative, it is also possible to determine the number of symbols available for a sidelink data channel on sub-channel(s) containing a sidelink control channel and on sub-channel(s) not containing a sidelink control channel separately. This means that the number of symbols available for a sidelink data channel sub-channel(s) will be determined by further considering whether the sub-channel(s) contains the PSCCH.

Next, reference is to made FIG. 2B to describe another example method for determining duration of the PSSCH according to embodiments of the present disclosure.

As illustrated in FIG. 2B, in a slot with 14 symbols, there are PSSCH_0 on a sub-channel containing PSCCH and PSSCH_1 on a sub-channel not containing PSCCH. For the two sub-channels, the duration of PSSCH can be determined separately.

For the duration of PSSCH_1 as illustrated in FIG. 2B, its duration can be determined in a similar way as those illustrated in FIG. 2A, i.e., $$D\_PSSCH\_1 = D\_PSSCH \qquad \text{(Equation 2)}$$

For more details, one can refer to the description with reference to FIG. 2A and thus detailed description will be omitted herein.

For the duration of PSSCH_0 as illustrated in FIG. 2B, its duration can be determined by further considering the PSCCH. As an example, the duration of PSSCH_0, i.e., N_PSSCH_0, can be determined as:

$$D\_PSSCH\_0 = N\_Symb - N\_AGC - N\_Gap - \\ N\_PSFCH - N\_PSFCH\_AGC - N\_PSFCH\_Gap - \\ N\_PSCCH \qquad \text{(Equation 3)}$$

wherein

N_Symb denotes the total number of OFDM symbols for the PSSCH in a slot;

N_AGC denotes the number of symbols for AGC in the slot;

N_Gap denotes the number of symbols for protection gap in the slot;

N_PSFCH denotes the number of symbols for PSFCH in the slot;

N_PSFCH_AGC denotes the number of symbols for AGC of PSFCH in the slot;

N_PSFCH_Gap denotes the number of symbols for gap of PSFCH in a slot; and

N_PSCCH denotes the number of symbols for PSCCH in a slot.

By means of the above equations, the terminal device could determine the duration of PSSCH_0 and PSSCH-1 respectively.

In FIGS. 2A and 2B, specific symbol numbers for AGC, GP, PSFCH, PSFCH_AGC, PSFCH_GP and PSCCH are illustrated. However, FIG. 2A and FIG. 2B are only given for illustrative purposes and the present disclosure is not limited thereto. In fact, these specific numbers might change in different cases or scenarios.

Reference is made back to FIG. 1, in block 130, the receiving terminal device may determine a DMRS pattern to be used for the sidelink data channel based on the received additional DMRS symbol number for the sidelink data channel and the determined duration of the sidelink data channel.

In some embodiments of the present disclosure, the terminal device determines the DMRS pattern corresponding to the received additional DMRS symbol number of the sidelink data channel and the determined duration of the sidelink data channel in a predetermined DMRS pattern mapping table. Only for illustrative purposes, references will be made to FIGS. 4 to 8 to describe example DMRS pattern mapping tables.

FIG. 4 illustrates an example DMRS pattern mapping table according to embodiments of the present disclosure. As illustrated in FIG. 4, Table 1 is obtained through left shifting a single-symbol DMRS for PUSCH mapping type A by one symbol, with intra-slot frequency hopping disabled by one symbol and symbols are indexed from 0 relative to the start of the slot. Due to the left shifting, it could enable an earlier channel estimation. The terminal device could obtain the DMRS pattern from Table 1 based on the determined duration of PSSCH and the additional DMRS symbol number as indicated in the received SCI. For example, for the PSSCH duration of 8 and the additional DMRS symbol number of 2, the DMRS pattern can be determined as (1, 6).

FIG. 5 illustrates another example DMRS pattern mapping table according to embodiments of the present disclosure. As illustrated in FIG. 5, Table 2 is obtained by combining and left shifting a single-symbol DMRS for PUSCH mapping type A (with intra-slot frequency hopping disabled by one symbol) and a single-symbol DMRS for PUSCH mapping type B (with intro-slot frequency hopping disabled for PSSCH duration of 5 to 7 symbols), and symbols are indexed from 0 relative to the start of the slot. Due to the left shifting, it could enable earlier channel estimation too, and for duration 5, 6, and 7, additional DMRS symbol can be used and thus channel estimation will be more accurate. The terminal device could determine the DMRS pattern from Table 2 based on the determined duration of PSSCH and the additional DMRS symbol number as indicated in the received SCI. For example, for the PSSCH duration of 6 and the additional DMRS symbol number of 2, the DMRS pattern can be determined as (1, 5).

FIG. 6 illustrates a further example DMRS pattern mapping table according to embodiments of the present disclosure. As illustrated in FIG. 6, in Table 3, it reuses a single-symbol DMRS for PUSCH mapping type A with intra-slot frequency hopping disabled by one symbol and symbols are indexed from 0 relative to the start of the slot. That is to say, Table 3 differs from Table 1 in FIG. 3 in that the single-symbol DMRS is not left shifted. Thus, it does not provide the benefit of earlier channel estimation; however, due to the reuse of PDSCH/PUSCH mapping type A DMRS pattern, inference cancelation between the sidelink and the downlink can be facilitated and the inference cancelation will be simpler due to the terminal device could know the DMRS pattern on both the sidelink data channel and the downlink channel simultaneously and inference cancelation can be performed based thereon. The terminal device could determine the DMRS pattern from Table 3, based on the determined duration of PSSCH and the additional DMRS symbol number as indicated in the received SCI. For example, for the PSSCH duration of 8 and the additional DMRS symbol number of 2, the DMRS pattern can be determined as (2, 7).

FIG. 7 illustrates a yet further example DMRS pattern mapping table according to embodiments of the present disclosure. As illustrated in FIG. 7, Table 4 could reuse a single-symbol DMRS for PUSCH mapping type B with intra-slot frequency hopping disabled and symbols are indexed from 0 relative to the first PSSCH symbol in the sub-channel(s). Due to the reuse of the PUSCH mapping Type B DMRS pattern, the solution will be much simpler and can enable earlier channel estimation. The terminal device could obtain the DMRS pattern from Table 4, based on the determined duration of PSSCH and the additional DMRS symbol number as indicated in the received SCI. For example, for the PSSCH duration of 8 and the additional DMRS symbol number of 2, the DMRS pattern is (0, 6).

FIG. 8 illustrates a still further example DMRS pattern mapping table according to embodiments of the present disclosure. As illustrated in FIG. 8, it is possible to use different mapping tables based on the configuration or pre-configuration of the duration determination of PSSCH. For example, if the duration determination for PSSCH does not consider PSCCH, i.e., adopts the solution as illustrated in FIG. 2A, table 3 can be used, and for duration determination for PSSCH considering PSCCH, i.e. the solution illustrated in FIG. 2B, Table 4 can be used. Thus, it is possible to have benefits of either table 3 or table 4 for different configuration or pre-configuration of duration determination solutions.

In some embodiments of the present disclosure, the number of additional DMRS symbol number for PSSCH can be indicated in a first stage of a two-stage SCI. That is to say, the receiving sidelink control information (SCI) from a transmitting terminal device comprising receiving the SCI in a first stage of a two-stage SCI. In some embodiments of the present disclosure, the SCI can be received over the physical layer signaling, i.e., the receiving sidelink control information (SCI) comprises receiving the SCI over a physical layer signaling. This is different from the NR Uu interface and could provide a dynamic or adjustment for the additional DMRS symbol number.

In some embodiments of the present disclosure, the SCI indicates an additional DMRS symbol number to be used in a slot identical to or later than a slot within which the SCI is received. That is to say, the SCI indicating the additional DMRS symbol number for PSSCH in slot n is transmitted in a slot m, wherein m is equal to or smaller than n. In addition, in some embodiments of the present disclosure, the SCI indicating the additional DMRS symbol number has at least two bits. For example, 2 bits can be used to indicate four different number, for example, 0, 1, 2 and 3 as illustrated in FIGS. 4 to 8. However, the present disclosure is not limited thereto the bits for SCI could be less or more.

FIG. 9 illustrates another communication method according to embodiments of the present disclosure. The other communication method can be performed at a transmitting terminal device in a sidelink communication.

As illustrated in FIG. 9, in block 910, the transmitting terminal device determines duration of the sidelink data channel according to the number of symbols within a slot and the number of symbols for a sidelink feedback channel.

In some embodiments of the present disclosure, the transmitting terminal device may determine the duration of the sidelink data channel further based on the subcarrier spacing. As illustrated in FIG. 3, for different SCS of the carrier, parameter configurations are different and thus the duration of PSSCH might be different and thus the determining duration of the sidelink data channel can be further based on a subcarrier spacing.

In some embodiments of the present disclosure, the transmitting terminal device may determine the duration of the sidelink data channel within a slot as the duration of the sidelink data channel without considering sidelink control channel.

In some embodiments of the present disclosure, the transmitting terminal device may determine a number of symbols available for a sidelink data channel on sub-channel(s) containing a sidelink control channel and a number of symbols available for a sidelink data channel on sub-channel (s) not containing a sidelink control channel separately.

Operations of the PSSCH duration determination at the transmitting terminal device are similar to those at the receiving terminal device. For details about the duration determination for PSSCH, one may refer to the description with reference to FIG. 2A and FIG. 2B and thus no further details will be elaborated herein.

In block 920, the transmitting terminal device determines an additional DRMS symbol number. For example, the terminal device may determine the additional DMRS symbol number at least based on a relative speed of the transmitting terminal device and the receiving terminal device.

The relative speed of the transmitting terminal device and the receiving terminal device can reflect a change speed of sidelink data channel which is quite related to the channel quality. Thus, it is can be an important factor for determining the additional DMRS symbol number. In other words, the additional DMRS symbol number can be in a positive correlation with the relative speed. Therefore, the relative speed can be considered in determining the additional DMRS symbol number. This solution can be applicable for both groupcast and unicast communication, and the relative speed can be provided from the higher layer to the physical layer of the transmitting terminal device.

In addition, or alternatively, the determination of additional DRMS symbol number may be based on any of the following factors:

sub-carrier spacing SCS to be used in the sidelink data channel;

absolute speed the transmitting terminal device and the receiving terminal device;

Modulation and Coding Scheme (MCS).

Next, in block 930, the transmitting terminal device determines a DMRS pattern to be used for the sidelink data channel based on the additional DMRS symbol number for the sidelink data channel and the determined duration of the sidelink data channel. In some embodiments of the present disclosure, the transmitting terminal device may determine the DMRS pattern corresponding to the additional DMRS symbol number of the sidelink data channel and the determined duration of the sidelink data channel in a predetermined DMRS pattern mapping table. The predetermined DMRS pattern mapping table can be any of those illustrated with reference to FIGS. 4 to 8. For details thereabout, one can refer to those description with reference to FIGS. 4 to 8.

Then, in block 940, the transmitting terminal device transmits sidelink control information (SCI) to a receiving terminal device, the SCI indicating an additional DMRS symbol number for the sidelink data channel.

In some embodiments of the present disclosure, the transmitting terminal device may transmit the SCI in a first stage of a two-stage SCI. In some embodiments of the present disclosure, the transmitting terminal device may transmit the SCI over a physical layer signaling.

In some embodiments of the present disclosure, the transmitting terminal device may further transmit the additional DRMS symbol number to a network device in accordance with a determination that the sidelink communication is performed in Mode 1. The sidelink communication can performed in Mode 1 or Mode 2. In Mode 1, the network device will schedule resources for the two terminal device; while in Mode 2, the transmitting terminal device monitors the channel availability and selects the resource for the sidelink communication itself. In case of Mode 1, the transmitting terminal device can further transmit the additional DRMS symbol number to a network device to assisting the network device to schedule transmission resource for the sidelink communication.

In some embodiments of the present disclosure, the SCI indicates an additional DMRS symbol number to be used in a slot identical to or later than a slot within which the SCI is received.

Hereinbefore, method 900 implemented at the transmitting terminal device is described with reference to FIG. 9 in brief. It can be appreciated that for details about the operations of method 900, one may refer to descriptions of FIGS. 1 to 8.

In addition, methods 100 and 900 are described in the order as illustrated in FIGS. 1 and 9. However, these operations are not necessarily be performed strictly in the illustrated sequence. For example, operations in block 110 can be performed after operations in block 120 and operations in block 110 and 120 can be performed simultaneously. As another example, operations in block 910 can be performed after the operation in block 920 and operations in two blocks can be performed simultaneously; operations in block 920 can be performed once the additional DMRS number is determined, which means it can be performed prior to operations in block 910, or 930, simultaneously with either of them.

In further aspects, apparatuses for performing the method 100 or 900 may include means for performing the respective steps of the method 100 or 900. The means may be implemented in any suitable form. For example, the means may be implemented in a circuitry or software module.

In some embodiments of the present disclosure, there is provided an apparatus for performing the communication method 100. The apparatus can be comprised in or performed at a receiving terminal device in a sidelink communication and one of its objects is to provide an improved DMRS transmission of sidelink data channel. The apparatus may include means for receiving sidelink control information (SCI) from a transmitting terminal device, the SCI indicating an additional DMRS symbol number for the sidelink data channel; means for determining duration of the sidelink data channel according to the number of symbols within a slot and the number of symbols for a sidelink feedback channel; means for determining a DMRS pattern to be used for the sidelink data channel based on the received additional DMRS symbol number for the sidelink data channel and the determined duration of the sidelink data channel.

In some embodiments of the present disclosure, the determining duration of the sidelink data channel may be further based on a subcarrier spacing.

In some embodiments of the present disclosure, the means for determining duration of the sidelink data channel within a slot may be further configured to: determine a maximum number of symbols for the sidelink data channel within a slot as the duration of the sidelink data channel without considering a sidelink control channel.

In some embodiments of the present disclosure, the means for determining duration of the sidelink data channel within a slot may be further configured to: determine a number of symbols available for a sidelink data channel on sub-channel (s) containing a sidelink control channel and a number of symbols available for a sidelink data channel on sub-channel (s) not containing a sidelink control channel separately.

In some embodiments of the present disclosure, the means for determining a DMRS pattern to be used for the sidelink data channel may be further configured to: determine the DMRS pattern corresponding to the received additional DMRS symbol number of the sidelink data channel and the determined duration of the sidelink data channel in a predetermined DMRS pattern mapping table.

In some embodiments of the present disclosure, the means for receiving sidelink control information (SCI) from a transmitting terminal device may be configured to receive the SCI in a first stage of a two-stage SCI.

In some embodiments of the present disclosure, the means for receiving sidelink control information (SCI) may be configured to receive the SCI over a physical layer signaling.

In some embodiments of the present disclosure, the SCI indicates an additional DMRS symbol number to be used in a slot identical to or later than a slot within which the SCI is received.

In some embodiments of the present disclosure, there is further provided another apparatus for performing the communication method 900. The apparatus can be comprised in or performed at a transmitting terminal device in a sidelink communication and one of its objects is to provide an improved DMRS transmission of sidelink data channel. The apparatus may include means for determining duration of the sidelink data channel according to the number of symbols within a slot and the number of symbols for a sidelink feedback channel; means for determining an additional DMRS symbol number ; means for determining a DMRS pattern to be used for the sidelink data channel based on the determined additional DMRS symbol number for the sidelink data channel and the determined duration of the sidelink data channel; and means for transmitting sidelink control information (SCI) to a receiving terminal device, the SCI indicating an additional DMRS symbol number for the sidelink data channel.

In some embodiments of the present disclosure, the means for determining duration of the sidelink data channel may be configured to determine the duration further based on the subcarrier spacing.

In some embodiments of the present disclosure, the means for determining duration of the sidelink data channel within a slot may be further configured to determine a maximum number of symbols for the sidelink data channel within a slot as the duration of the sidelink data channel without considering sidelink control channel.

In some embodiments of the present disclosure, the means for determining duration of the sidelink data channel within a slot may be further configured to determine a number of symbols available for a sidelink data channel on sub-channel(s) containing a sidelink control channel and a number of symbols available for a sidelink data channel on sub-channel(s) not containing a sidelink control channel separately.

In some embodiments of the present disclosure, the means for determining a DMRS pattern to be used for the sidelink data channel may be further configured to determine the DMRS pattern corresponding to the additional DMRS symbol number of the sidelink data channel and the determined duration of the sidelink data channel in a predetermined DMRS pattern mapping table.

In some embodiments of the present disclosure, the means for transmitting sidelink control information (SCI) to a receiving terminal device may be further configured to transmit the SCI in a first stage of a two-stage SCI.

In some embodiments of the present disclosure, the means for transmitting sidelink control information (SCI) may be further configured to transmit the SCI over a physical layer signaling.

In some embodiments of the present disclosure, the SCI indicates an additional DMRS symbol number to be used in a slot identical to or later than a slot within which the SCI is received.

In some embodiments of the present disclosure, the transmitting terminal device may further comprise means for determining the additional DMRS symbol number at least based on a relative speed of the transmitting terminal device and the receiving terminal device.

In some embodiments of the present disclosure, the transmitting terminal device may further comprise means for transmitting information on the additional DMRS symbol number to a network device in accordance with a determination that the sidelink communication is performed in Mode 1.

Hereinbefore, the apparatuses for performing methods 100 and 900 are described in brief. It can be noted that for details about operations of these apparatuses, one may refer to descriptions of the respective steps of the methods with reference to FIGS. 1 to 9.

Those skilled in the art will appreciate that the aforesaid examples are only for illustration not limitation and the present disclosure is not limited thereto; one can readily conceive many variations, additions, deletions and modifications from the teaching provided herein and all these variations, additions, deletions and modifications fall the protection scope of the present disclosure.

In addition, in some embodiment of the present disclosure, these apparatuses may include at least one processor. The at least one processor suitable for use with embodiments of the present disclosure may include, by way of example, both general and special purpose processors already known or developed in the future. These apparatuses may further include at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause these apparatuses to at least perform operations according to the method as discussed with reference to FIGS. 1 to 9 respectively.

Figure 10:
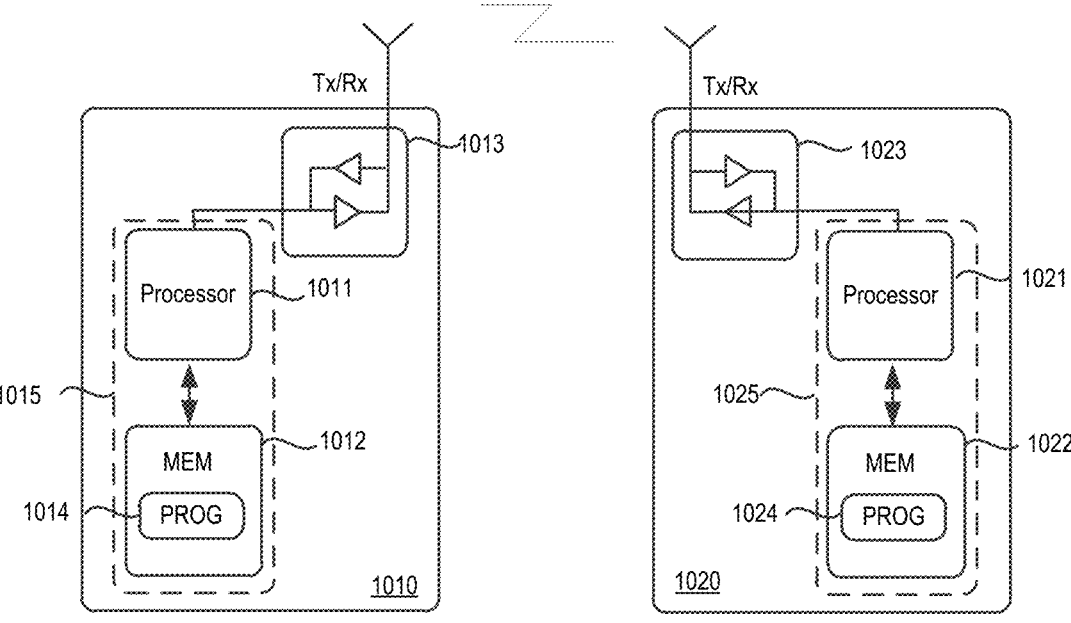
FIG. 10 schematically illustrates a simplified block diagram of a communication system 1000 that can implement the communication solution according to embodiments of the present disclosure.

FIG. 10 schematically illustrates a simplified block diagram of a communication system 1000 that can implement the simultaneous connection based handover process according to embodiments of the present disclosure. The communication system 1000 include an apparatus 1010 that may be embodied as or included in a receiving terminal device, and an apparatus 1020 that may be embodied as or included in a transmitting terminal device.

The apparatus 1010 includes at least one processor 1011, such as a data processor (DP) and at least one memory (MEM) 1012 coupled to the processor 1011. The apparatus 1010 may further include a transmitter TX and receiver RX 1013 coupled to the processor 1011, which may be operable to communicatively connect to the apparatus 1020. The MEM 1012 stores a program (PROG) 1014. The PROG 1014 may include instructions that, when executed on the associated processor 1011, enable the apparatus 1010 to operate in accordance with embodiments of the present disclosure, for example method 100. A combination of the at least one processor 1011 and the at least one MEM 1012 may form processing means 1015 adapted to implement various embodiments of the present disclosure.

The apparatus 1020 includes at least one processor 1021, such as a DP, and at least one MEM 1022 coupled to the processor 1021. The apparatus 1020 may further include a suitable TX/RX 1023 coupled to the processor 1021, which may be operable for wireless communication with the apparatus 1010. The MEM 1022 stores a PROG 1024. The PROG 1024 may include instructions that, when executed on the associated processor 1021, enable the apparatus 1020 to operate in accordance with the embodiments of the present disclosure, for example the method 900. A combination of the at least one processor 1021 and the at least one MEM 1022 may form processing means 1025 adapted to implement various embodiments of the present disclosure.

Various embodiments of the present disclosure may be implemented by computer program executable by one or more of the processors 1011 and 1021, software, firmware, hardware or in a combination thereof.

The MEMs 1012 and 1022 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 1011 and 1021 may be of any type suitable to the local technical environment, and may include one or more of general purpose computers, special purpose computers, microprocessors, digital signal processors DSPs and processors based on multicore processor architecture, as non-limiting examples.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method performed by a terminal device, the method comprising:

determining a plurality of symbols for transmission of a Physical Sidelink Shared Channel (PSSCH) based on symbols within a slot, symbols for Physical Sidelink Feedback Channel (PSFCH), and a symbol immediately preceding the symbols for the PSFCH;

determining positions for Demodulation Reference Signal (DMRS) symbols for the PSSCH according to a duration of scheduled resources for the transmission of the PSSCH and a number of the DMRS symbols for the PSSCH; and transmitting the PSSCH on the plurality of symbols within the slot, wherein the number of the DMRS symbols for the PSSCH is indicated by a first stage Sidelink Control Information (SCI) of two stages of SCI, and wherein a last symbol in the slot is a symbol for a gap, and the symbols for the PSFCH comprise a first half of the symbol for the gap.

2. The method of claim 1, wherein the determining the plurality of symbols for the transmission of the PSSCH comprises: excluding the symbols for the PSFCH in the slot, the symbol immediately preceding the symbols for the PSFCH, and a last symbol for sidelink in the slot, and wherein resource allocation for the PSSCH starts at a symbol immediately after a first starting symbol in the slot.

3. The method of claim 1, wherein the positions for the DMRS symbols for the PSSCH are at symbols 1, 4, 7, and 10 when the duration is 13 symbols.

4. A method performed by a terminal device, the method comprising:

receiving a first stage Sidelink Control Information (SCI) of two stages of SCI for scheduling transmission of a Physical Sidelink Shared Channel (PSSCH);

determining a plurality of symbols for the transmission of the PSSCH based on symbols within a slot, symbols for Physical Sidelink Feedback Channel (PSFCH) and a symbol immediately preceding the symbols for the PSFCH; and receiving the PSSCH on the plurality of symbols within the slot, wherein the SCI further comprises a number of Demodulation Reference Signal (DMRS) symbols for the PSSCH, and wherein the method further comprises:

determining positions for DMRS symbols for the PSSCH according to a duration of scheduled resources for the transmission of the PSSCH and the number of the DMRS symbols for the PSSCH, wherein a last symbol in the slot is a symbol for a gap, and the symbols for the PSFCH comprise a first half of the symbol for the gap.

5. The method of claim 4, wherein the positions for the DMRS symbols for the PSSCH are at symbols 1, 4, 7, and 10 when the duration is 13 symbols.

6. A terminal device comprising a processor configured to:

determine a plurality of symbols for transmission of a Physical Sidelink Shared Channel (PSSCH) based on symbols within a slot, symbols for Physical Sidelink Feedback Channel (PSFCH), and a symbol immediately preceding the symbols for the PSFCH;

determine positions for Demodulation Reference Signal (DMRS) symbols for the PSSCH according to a duration of scheduled resources for the transmission of the PSSCH and a number of the DMRS symbols for the PSSCH; and transmit the PSSCH on the plurality of symbols within the slot, wherein the number of the DMRS symbols for the PSSCH is indicated by a first stage Sidelink Control Information (SCI) of two stages of SCI, and wherein a last symbol in the slot is a symbol for a gap, and the symbols for the PSFCH comprise a first half of the symbol for the gap.

7. The terminal device of claim 6, wherein the processor is configured to determine the plurality of symbols for the transmission of the PSSCH by excluding the symbols for the PSFCH in the slot, the symbol immediately preceding the symbols for the PSFCH, and a last symbol for sidelink in the slot, and wherein resource allocation for the PSSCH starts at a symbol immediately after a first starting symbol in the slot.

8. The terminal device of claim 6, wherein the positions for the DMRS symbols for the PSSCH are at symbols 1, 4, 7, and 10 when the duration is 13 symbols.

9. The method of claim 1, wherein the plurality of symbols are consecutive symbols.

10. The method of claim 4, wherein determining the plurality of symbols for the transmission of the PSSCH comprising:

excluding the symbols for the PSFCH, the symbol immediately preceding the symbols for the PSFCH, and a last symbol for sidelink in the slot, and wherein resource allocation for the PSSCH starts at a symbol immediately after a first starting symbol in the slot.

11. The method of claim 4, wherein the plurality of symbols are consecutive symbols.

12. The terminal device of claim 6, wherein the plurality of symbols are consecutive symbols.

13. The method of claim 1, wherein the slot comprises 14 symbols for normal cyclic shift or comprises 12 symbols for extended cyclic shift on Intelligence Transportation System (ITS) dedicated carrier.

* * * * *